Aug. 8, 1933.  D. H. STEWART  1,921,954
MOTION PICTURE AND SOUND RECORD FILM
Filed March 25, 1929
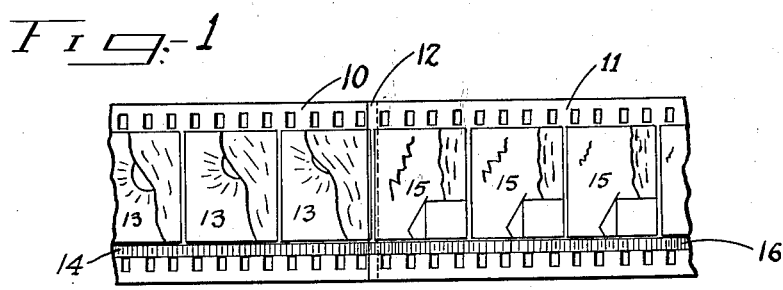
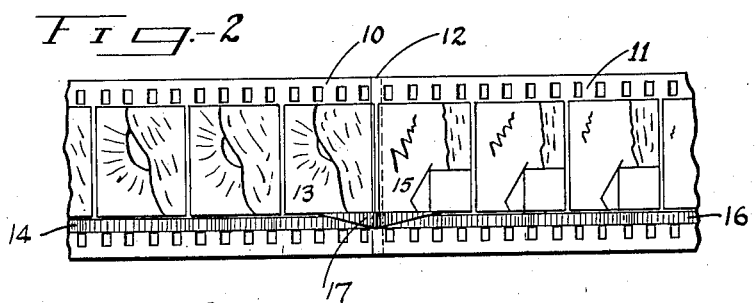
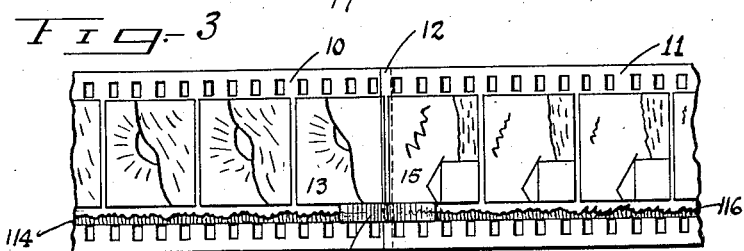
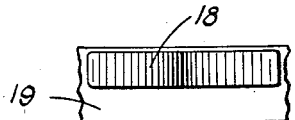
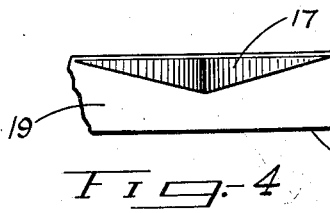
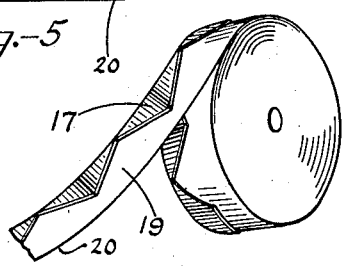
INVENTOR
DONALD H. STEWART
BY
ATTORNEY Patented Aug. 8, 1933

1,921,954

UNITED STATES PATENT OFFICE 1,921,954

MOTION PICTURE AND SOUND RECORD FILM

Donald H. Stewart, Rochester, N. Y., assignor to Eastman Kodak Company, Rochester, N. Y., a Corporation of New York Application March 25, 1929. Serial No. 349,827

9 Claims. (Cl. 274—43)

This invention relates to sound photography and more particularly to an article and a method useful in preventing the objectionable sound effects at the change-over from one sound theme to another.

In the manufacture and use of film bearing a sound record, it is frequently necessary to join two unrelated sound records, for example when the film is originally edited or when a part of the film is cut out in the case of repairing a break in the sound record, so that an objectionable, abrupt change in the reproduced sound takes place.

In accordance with the present invention a method of and material for use in preventing such an objectionable sound effect is provided. In its specific form the invention contemplates the use of a varying density strip or splicing element at the junction of two sound records.

For a more complete understanding of the invention reference is made to the drawing in which Fig. 1 is a portion of a motion picture film formed of two sections, each bearing a series of motion pictures together with a related sound record; Fig. 2 represents the same strip of film with the junction of the two sound record portions having a piece of volume controlling material applied thereto; Fig. 3 represents a similar section with a modified form of volume controlling material applied at the junction of the two sound records; Fig. 4 is an enlarged view of the volume controlling material, shown in Fig. 2, mounted in such form that it may be conveniently applied to the junction of two sound records; Fig. 5 is a similar enlarged view of the modified volume controlling strip shown in Fig. 3; while Fig. 6 shows how the volume controlling materials of Figs. 4 and 5 may be formed into a roll which may be manufactured and sold as a separate article.

In the production of reels of film bearing motion pictures with a related sound record, it is frequently necessary in editing such film to join two sections together where the sound records associated with said sections are not related so that the change in sound at the change-over from one sound record to another at the junctions of two sections is particularly objectionable. Furthermore in repairing film bearing sound records in case of a break in the sound record or a break in the perforations it is necessary to cut out a section of the film, so that the sound record becomes mutilated, there is a resulting objectable interruption when the sound record is reproduced. Fig. 1 represents two sections of film 10 and 11 joined together or spliced at point 12, in which section 10 has a series of pictures 13 showing one subject and having a related sound record 14 for producing a sound accompaniment appropriate to these pictures, while section 11 has pictures 15 related to another subject matter and a related sound record 16 bearing a sound accompaniment appropriate thereto. Since the sound accompaniment on record 14 is not related to the sound accompaniment on record 16 there is an objectionable sound effect produced at the junction 12 in passing from the reproduction of one sound record to the other.

In accordance with the present invention a method of overcoming this objectionable effect is provided which comprises gradually depressing the volume of the sound accompaniment on the sound record 14 adjacent the junction point 12 and then gradually increasing the volume of the sound accompaniment on the sound record 16 in the progressive movement of the film. This effect is obtained by attaching a splicing element having gradually varying optical density, covering a portion of the sound record at each side of the junction point 12. As shown in Figs. 2 and 4 this material may be in the form of a so-called density wedge 17, triangular in shape, cemented or otherwise fastened over parts of sound records 14 and 16. This wedge gradually decreases in transparency from each end until at its center point, coinciding with junction 12 it may be substantially opaque.

In Fig. 3 a modified form of the strip 18 is shown applied to the film and covering a portion of the sound record 114—116 at each side of the junction 12. This sound strip, as shown in enlarged form in Fig. 5, may be rectangular in shape instead of triangular as shown in the two preceding figures. This strip 18 likewise varies in transparency or optical density from its ends to its center portion being densest at the center portion which consides with junction 12.

It is essential that the pieces 17 and 18 should cover only the sound record portion of the film and not overlap any of the picture areas. For this reason the pieces 17 and 18 are mounted on a suitable carrier such as a strip of paper 19 of such width that when its lower edge 20 registers with the lower edge of the film the pieces 17 and 18 are in proper position. Either of the pieces 17 and 18 may be attached to the junction of the film sections by applying a suitable adhesive such as mucilage to the pieces and then placing the densest portion of the piece so treated on the junction 12 with the upper edge of the piece properly alined by means of the paper 19. When the adhesive has dried, the paper is stripped off and the film is ready for use.

I consider as included in my invention all other modifications and equivalents as may fall within the scope of the appended claims.

What I claim is:

1. In the art of reproduction of sound from photographic records, the method of reducing objectionable sound effects at the point of change-over from one accompaniment to another on the same continuous record which comprises applying to the sound record adjacent the point of change-over a layer which progressively increases the density of the record.

2. In the art of reproduction of sound from photographic records, the method of reducing objectionable sound effects at the point of change-over from one accompaniment to another on the same continuous record which comprises applying to the sound record at the point of change-over a layer which gradually increases the density of the sound record to substantially the point of change-over and then gradually diminishes the density of the record from that point.

3. In the art of sound photography the method of reducing the objectionable sound effect at the change-over from one sound record to another which comprises superimposing on a portion of the sound record at each side of the junction point a piece of flexible material which gradually increases in optical density up to the change-over point.

4. In the art of reproduction of sound from photographic records, the method of reducing objectionable sound effects from the change-over of one accompaniment to another on the same continuous record which comprises applying to said sound record a layer progressively increasing in width and progressively increasing in light absorption to substantially the point of change-over.

5. In the art of reproduction of sound from photographic records, the method of reducing objectionable sound effects from the change-over of one accompaniment to another on the same continuous record which comprises applying to said sound record a layer progressively increasing in width and light absorption to substantially the change-over point and which progressively diminishes in width and light absorption from that point.

6. A film having thereon two consecutive areas containing photographic sound records, and a piece of material of varying light absorbing power overlying a portion of each of said sound records.

7. A film having two consecutive areas containing photographic sound records joined at their ends and a piece of flexible material tapered at its ends having varying light absorbing power, overlying a portion of each of said sound records.

8. As an article of manufacture a strip carrier, and a plurality of elements adapted to cover a sound record at a splice lying entirely on and temporarily attached to the said carrier by adhesive permitting said elements to be readily stripped therefrom.

9. As an article of manufacture, a carrier, a plurality of relatively small pieces of material temporarily attached to the carrier, each of said pieces of material having varying light absorbing power and being adapted to be attached to a sound track film.

DONALD H. STEWART.